Oct. 27, 1970 S. M. FELDMAN 3,537,013

DIGITAL PHASE LOCK LOOP

Filed July 31, 1967 4 Sheets-Sheet 1

INVENTOR.

SAMUEL M. FELDMAN

BY Alfred C. Hill

AGENT

INVENTOR.
SAMUEL M. FELDMAN
BY Alfred C. Hill
AGENT

Oct. 27, 1970 S. M. FELDMAN 3,537,013

DIGITAL PHASE LOCK LOOP

Filed July 31, 1967 4 Sheets-Sheet 3

INVENTOR.
SAMUEL M. FELDMAN
BY Alfred C. Hill
AGENT

INVENTOR.
SAMUEL M. FELDMAN
BY
Alfred C. Hill
AGENT 3,537,013
DIGITAL PHASE LOCK LOOP
Samuel M. Feldman, Bellevue, N.J., assignor to International Telephone and Telegraph Corporation, Nutley, N.J., a corporation of Delaware
Filed July 31, 1967, Ser. No. 657,209
Int. Cl. H03k *1/16*
U.S. Cl. 328—63 6 Claims

ABSTRACT OF THE DISCLOSURE

An N count binary counter counts clock pulses having a repetition frequency of N times the repetition frequency of reference pulses to produce timing pulses having the repetition frequency of the reference pulses. The timing pulses are phase locked to the reference pulses by controlling the counting of the counter. The counting is controlled by a constant number of counts until lock is achieved, or the counting is controlled by a varying number of counts until lock is achieved, the larger counting change occurring far from lock and the smaller counting change occurring close to lock.

BACKGROUND OF THE INVENTION

This invention relates to phase lock loops for synchronizing a local timing signal to a reference signal, such as a received digital signal.

In recent years pulse code modulation (PCM) transmission has become widely used in space telemetry, satellite communications and other applications where the ratio of signal level to white noise power is apt to be fairly low. It has been shown that the signal-to-noise ratio can be optimized in any transmission system by use of matched filter for detection in the receiver. In the case of decoding PCM where there is no correlation between bits, a matched filter is particularly easy to implement. This is done by integrating the signal over the time of one bit and at the end of the integration making a decision as to whether the bit was a one or a zero. The integration time is determined by a local clock producing a timing signal in the receiver which is synchronized with the incoming bit stream. Achieving and maintaining this synchronization is not an easy task since the incoming signal is likely to be fairly noisy.

There are many techniques for locking a local timing signal to a stream of digital data but basically they are very similar. Typically, synchronization is obtained by employing a voltage controlled oscillator, some type of phase detector and an integrating network. The phase detector detects the phase error between the incoming signal and the output of the voltage controlled oscillator with this error signal being integrated and applied to the voltage controlled oscillator for control thereof to establish the desired synchronization. This type of phase lock loop is relatively good when time division interleaving of a plurality of transmissions are on a bit by bit basis. However, present day transmission techniques are employing a burst by burst multiplexing arrangement. This type of multiplexing is advantageous since less time is lost to guard time due to fewer guard times being required. However, with burst by burst multiplexing there is a long time between successive transmissions from a given station and in the case of satellite communication the motion of the satellite requires resynchronization of the local timing signal with each new burst of data. The time required during lock up of course means wasted information and the above-described typical phase lock loop does not have the ability to maintain the phase condition of the output of the voltage controlled oscillator achieved on previous phase lock and, thus, will drift increasing the time for resynchronization on the next succeeding burst of information.

One way of providing memory for the phase lock loop is to have the input data stream shock excite a resonant device, such as a filter, to achieve a sine wave signal equal to the bit repetition frequency, square the resultant signal, differentiate the squared signal and full wave rectify the differentiated signal to produce narrow pulses where the original data changed from one state to another. These narrow pulses then sample the voltage controlled oscillator output and the resultant error signal, which is proportional to the distance from a zero cross-over of the voltage controlled oscillator output and the point of sampling, is held in a holding circuit. Provided the holding circuit has a long enough time constant the phase lock loop will not drift from its phase condition achieved at lock in a burst by burst transmission technique. However, such circuits have a lot of reactance, respond slowly and as a result will require many bits before the voltage controlled oscillator is locked to the incoming data.

SUMMARY OF THE INVENTION

An object of the present invention is to provide a digital phase lock loop overcoming the disadvantage of the above-mentioned prior art phase lock loops.

Another object of the invention is to provide a digital phase lock loop wherein the phase of the timing signal is adjusted to achieve the desired lock without controlling the local clock or oscillator.

A further object of the present invention is to provide a digital phase lock loop which will maintain the phase of the timing signal achieved at lock, without incorporating appreciable reactance, even if the reference signal is lost for a long period of time.

A feature of this invention is the provision of a digital phase lock loop comprising a first source of reference pulses having a given repetition frequency, a second source of clock pulses having a repetition frequency equal to N times the given repetition frequency, where N is a predetermined integer greater than one, a master binary counter having a count of N coupled to said second source to produce timing pulses having a repetition frequency equal to the given repetition frequency, and logic circuitry coupled to the first and second sources and the master counter responsive to the output of at least one stage of the master counter and the reference pulses to adjust the counting of the master counter to phase lock the timing pulses to the reference pulses.

Another feature of this invention is the provision of logic circuitry which adjusts the counting of the master counter by changing the count of the master counter by a constant value.

A further feature of this invention is the provision of logic circuitry which adjusts the counting of the master counter by changing the count of the master counter by a variable amount, the largest count changed occurring far from the lock condition and the smallest count change occurring close to the lock condition.

Still another object of this invention is the provision of a source of reference signals which includes a source of white noise and digital signals having a bit frequency equal to the given repetition frequency.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Before proceding with the description of the embodiments disclosed herein a comment must be made about the operation of the flip flops employed therein. When a trigger input is applied to the line separating the two stages of the flip flop, the flip flop is symmetrically triggered so that it will be changed from one binary condition to the other binary condition. When the triggering input is applied to one of the stages of the flip flop that stage is triggered to a "1" condition if it is not already in this condition. It should be additionally noted that regardless of where the triggering pulse is applied the flip flop is triggered by a positive going pulse, that is a pulse going from the "0" condition to the "1" condition.

Figure 1:
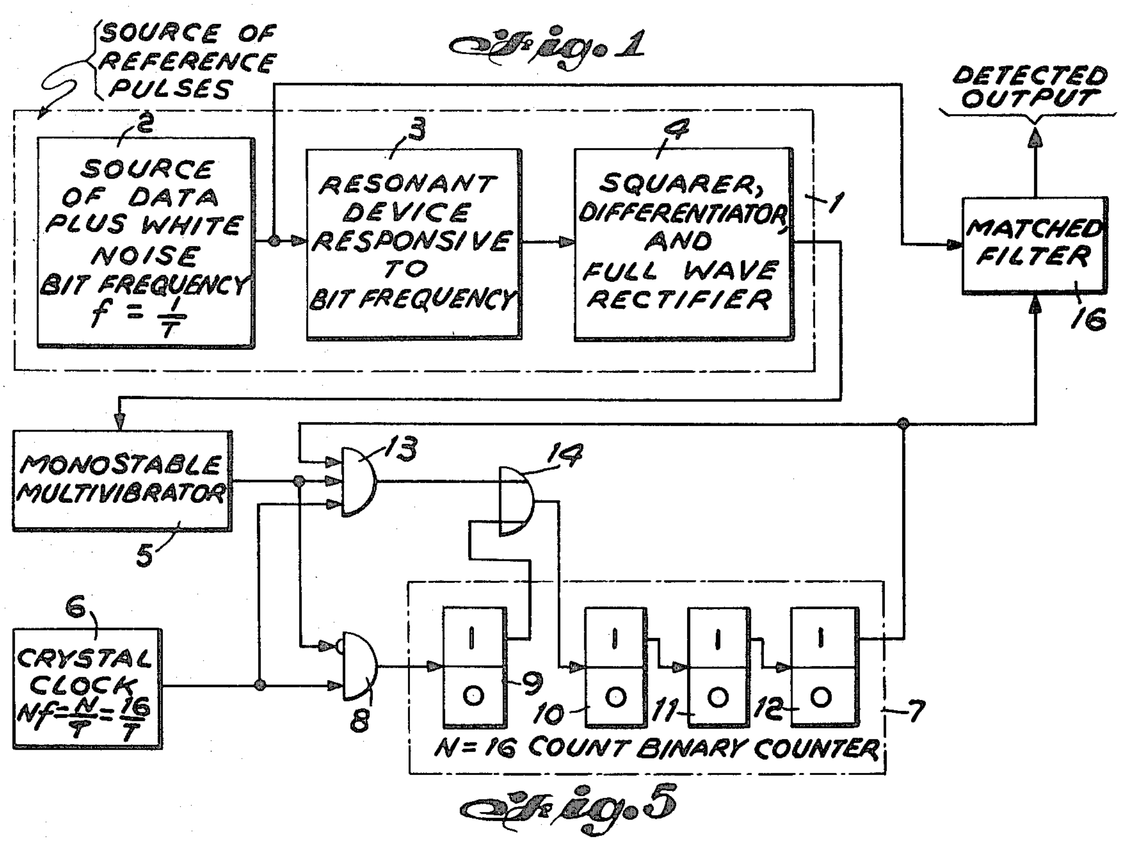
FIG. 1 is a block diagram of one embodiment of the digital phase lock loop in accordance with the principles of this invention.

Referring to FIG. 1, a digital phase lock loop in accordance with the principles of this invention is illustrated as including source 1 of reference pulses which will include a source 2 of digital data plus white noise having a bit frequency equal to *f*. The output of source 2 is coupled to resonant device 3 responsive to the bit frequency to produce a sine wave output having a frequency equal to the bit frequency. This resonant device 3 may be a resonant cavity or a filter appropriately tuned to the bit frequency. The output of device 3 is squared, differentiated and full wave rectified in circuit 4 to produce a train of pulses having a repetition frequency equal to the bit frequency, such as illustrated in curves F and L, FIG. 2. The output of circuit 4 is coupled to monostable multivibrator 5 to provide a pulse of sufficient width to assure time coincidence with the clock pulses but must be slightly less than $T/16$ so that no more than one clock pulse will be passed upon coincidence between the clock pulse and the output pulse of multivibrator 5.

Crystal clock 6 having a frequency equal to N*f* $(N/T)$ provides the pulses to be counted by the N count binary counter 7 through INHIBIT gate 8. For purposes of explanation, it has been assumed that N is equal to 16 thus the crystal clock produces pulses having a repetition frequency equal to 16*f* and binary counter 7 has a count of 16 provided by the four flip flops 9, 10, 11 and 12.

Figure 2:
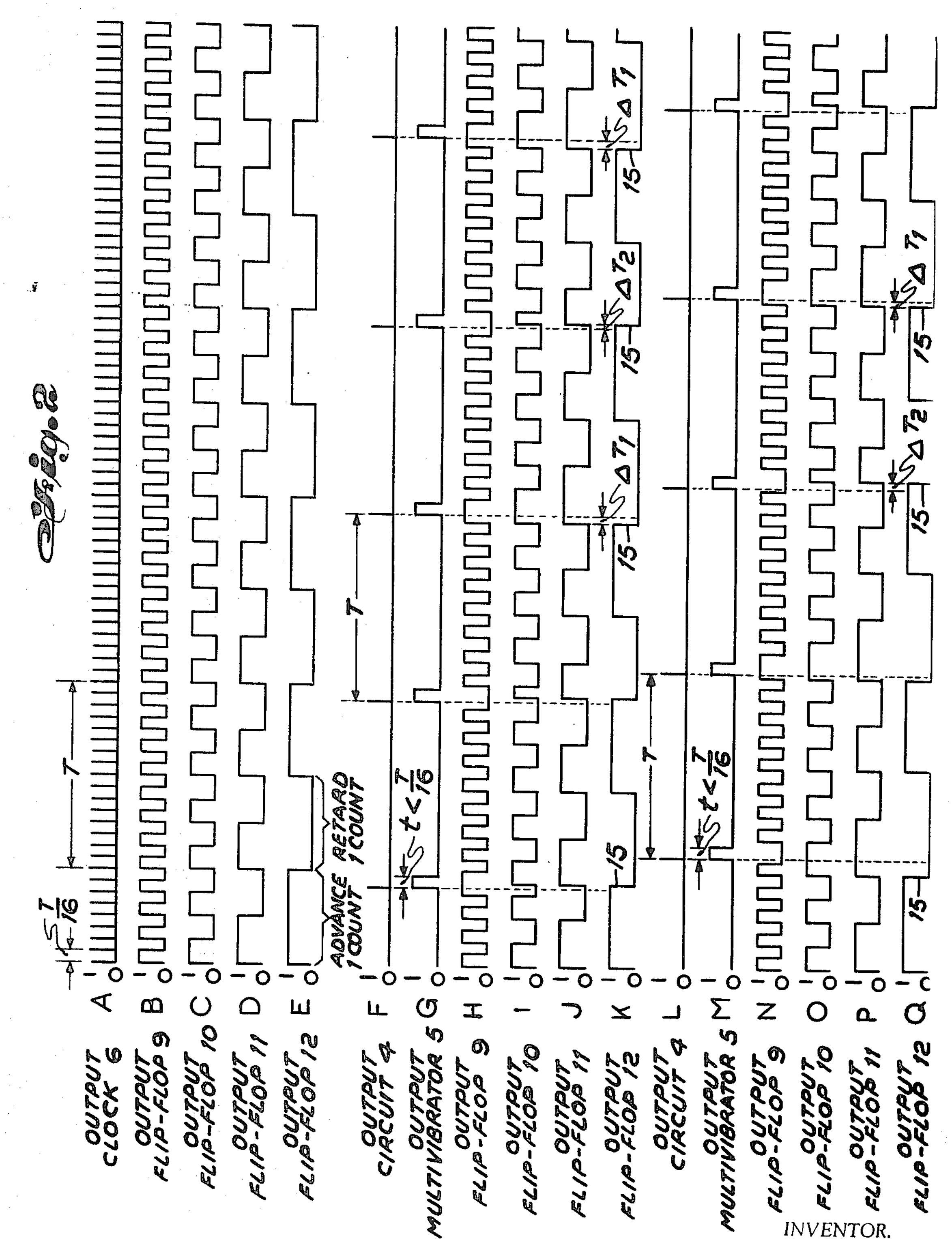
FIG. 2 is a timing diagram illustrating the operation of the digital phase lock loop of FIG. 1.

Curve A illustrates the clock pulse output of clock 6 and curves B through E, FIG. 2 illustrates the normal counting of counter 7. According to the arrangement of the digital phase lock loop of FIG. 1 the phase lock is achieved by controlling the count of counter 7 by one count, either advancing the count by one or retarding the count by one.

To explain the count control of the arrangement of FIG. 1 reference is made to curves F through K, FIG. 2. The first pulse the output of circuit 4, as illustrated in curve F, triggers multivibrator 5 to produce the pulse as illustrated in curve G. Each succeeding pulse from circuit 4 will produce a pulse output from multivibrator 5 as illustrated in curves F and G. Due to the condition of the the output of flip flop 12, as illustrated in curve E, the count of counter 7 must be advanced to achieve phase lock. This indication of advance is provided by AND circuit 13 which receives a signal in the "1" condition from the "1" output of flip flop 12, an output from multivibrator 5 and an output from clock 6. The output from multivibrator 5 will also inhibit the passage of the clock pulses through INHIBIT gate 8. The output from AND gate 13 is coupled to OR gate 14 and, hence, to flip flop 10. In this condition, the counting of flip flops 9 and 10 are illustrated in curves H and I, respectively. The resultant count of flip flops 11 and 12 are illustrated in curves J and K. These curves illustrating the counting taking place in the flip flop of count 7 show that the edge 15, the local timing pulse, is moved closer to phase synchronization with the first reference pulse from circuit 4. Since there is still a "1" condition signal from the output of flip flop 12 upon occurrence of the next pulse output of circuit 4, AND gate 13 will again be activated to provide an output which is coupled to OR gate 14 and, hence, to flip flop 10 to again advance the count of counter 7. Due to this counting advance, the third output pulse from circut 4 will now be in the position relative to the edge 15 to retard the count of counter 7. Since the output of flip flop 12 is in a "0" signal condition, AND gate 13 will not be activated but INHIBIT gate 8 will have an input applied to its inhibit terminal to stop one clock pulse from reaching flip flop 9 thereby retarding the count of counter 7, as illustrated in curves H through K. It will be observed that edge 15 is slightly ahead of the fourth pulse output of circuit 4 and, thus, the counter will be advanced since AND gate 13 is activated due to the signal in the "1" condition from flip flop 12. Upon occurrence of the fifth pulse output from circuit 4, the operation of retard will be indicated since this pulse from circuit 4 is now ahead of edge 15. This actually is a condition of lock with the timing signal provided by edge 15 oscillating from the advance to the retard condition as indicated in curve K. This phase error ΔT can only be adjusted to within $T/N$ but in most applications this is not a drawback since the high speed logic of the phase lock loop of this invention will work at bit rates of several megacycles and actually the relative phase error is relatively small. For instance, $$\Delta T/T=(\Delta T_1+\Delta T_2)/T=\frac{T/N}{T}=1/N=1/16$$

or 6.3%, where N=16.

The curves L through Q, FIG. 2 illustrate the operation of the digital phase lock loop of this invention when the pulse output from circuit 4 is ahead of edge 15 of the output of flip flop 12 requiring a retarding of the count of counter 7. As mentioned hereinabove to retard the count of counter 7 there is no output from AND gate 13 but the output from INHIBIT gate 8 is inhibited to thereby retard the count of counter 7. This retarding operation is fully illustrated in Curves L and Q and needs no further explanation. It should be mentioned however, that as in the case of the operation of advancing the count the edge 15 oscillates with a phase error of ΔT.

The output from counter 7 and the output from source 2 are coupled to a matched filter 16 to provide the detected output.

Figure 3:
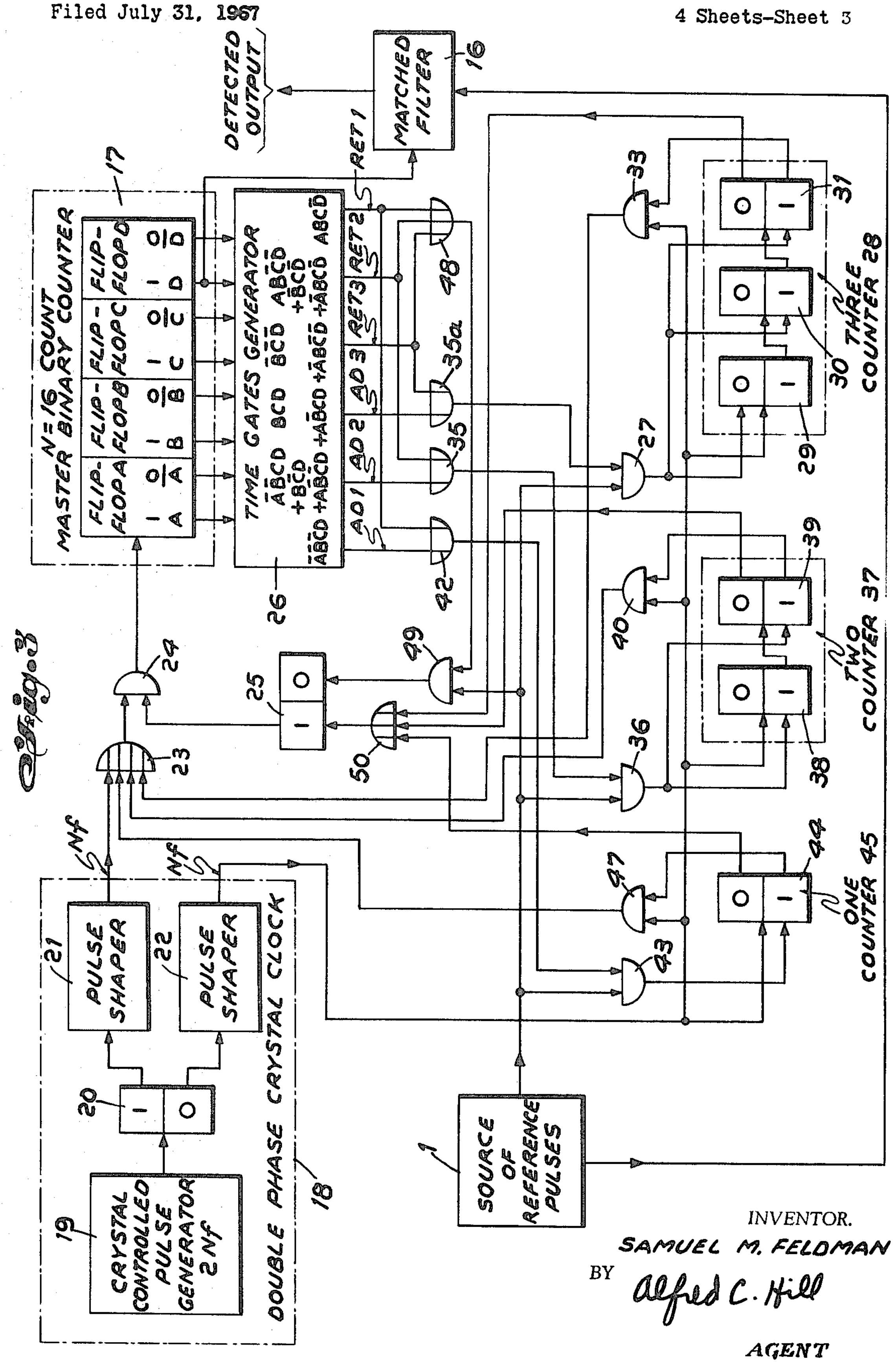
FIG. 3 is a block diagram of another embodiment of the digital phase lock loop in accordance with the principles of this invention.
Figure 4:
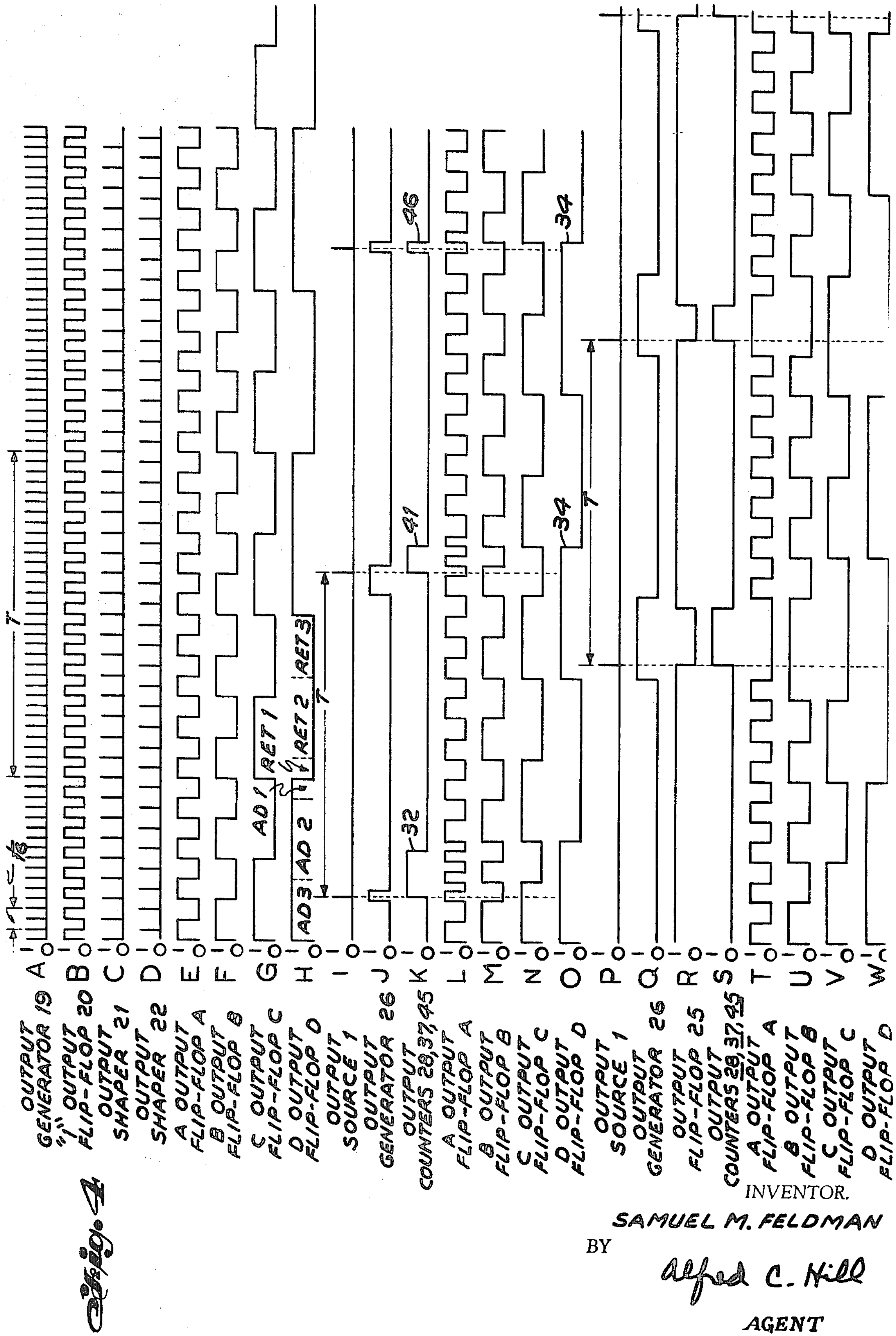
FIG. 4 is a timing diagram illustrating the operation of the digital phase lock loop of FIG. 3.

Referring to FIGS. 3 and 4, there is illustrated therein the equipment and operation thereof to provide a variable count control so that when the output of master binary conuter 17 is far from the lock condition the count is advanced or retarded three times and as it approaches the lock condition the count is adavnced or retarded by two counts and then by one count as lock becomes eminent. As in the case of the arrangement of FIG. 1, source 1 of reference pulses is provided and contains the same components described with respect to FIG. 1. The clock signal employed in the arrangement of FIG. 3 is actually a double phase clock wherein the pulses of one output from the double phase crystal clock 18 is intermediate the pulses of the other output of clock 18. This is accomplished by providing a crystal controlled pulse generator 19 operating at a frequency 2N*f*, as illustrated in curve A, FIG. 4. The output of generator 19 is applied to flip flop 20 which provides a "1" output, as illustrated in curve B, FIG. 4. The "1" output is applied to pulse shaper 21 and produces an output as illustrated in curve C, FIG. 4. The "0" output of flip flop 20 is applied to pulse shaper 22 to provide the second output from clock 18, as illustrated in curve D, FIG. 4. Pulse shapers 21 and 22 may be provided by different known circuits. One of these circuits may include a differentiator and full wave rectifier. The output from shaper 21 is coupled to OR gate 23 and hence to AND gate 24 for application to counter 17. A flip flop 25 which is part of the logic circuitry controlling the count of conuter 17 provides at all times, except when the "0" stage is triggered, a "1" output so that AND gate 24 is enabled to pass the clock pulses from shaper 21.

The logic circuitry further includes generator 26 coupled to all the outputs of the flip flops A, B, C and D of counter 17 to produce time gates as dictated by the logic equations disposed above the output terminals of generator 26. A gate output on output AD1 means advance one count, a gate output on output AD2 means advance two counts and a gate output on output AD3 means advance three counts. A gate output on output RET 3 means retard three counts while gate outputs on output RET 2 and RET 1 means retard two counts and retard one count, respectively. Curves E through H, FIG. 4 illustrates the normal count of counter 17 and indicates in Curve H the regions of variable count control.

The operation necessary to advance the count of counter 17 is illustrated in Curves I through O, FIG. 4. The output from source 1 (curve I) is coupled to AND gate 27 since the pulse from source 1, is in the region for advancing the count by three. Three counter 28 will be set to given conditions by the output of AND gate 27 having one input coupled to OR gate **35*a* and the other input coupled to source 1. For instance, flip flop 29 will have its "0" stage set to the "1" condition and the "1" stage will be set to the "0" condition; flip flop 30 will have its "1" stage set to the "1" condition and flip flop 31 will have its "1" stage set to the "1" condition. The output from shaper 22 is applied to the symmetrical triggering point of flip flop 29 of counter 28 to start counting the pulses at the output of shaper 22, curve D, FIG. 4. The output of counter 28 is illustrated by pulse 32 in curve K, FIG. 4. The output from counter 28 taken from the "1" output is applied to AND gate 33 along with the pulses from shaper 22. The output from AND gate 33 which are three pulses of the output from shaper 22 are coupled to OR gate 23 for application through AND gate 24 to counter 17 along with the pulse output of shaper 21 to advance the count of the counter as illustrated in curves L through O. When the next pulse from source 1 is received, the output from counter 17 will be in the region relative to edge 34 to advance the count of counter 17 by two. Thus, the AD2 output of generator 26 is coupled through OR gate 35 to AND gate 36 which also has coupled thereto the output from source 1. The output from HAND gate 36 sets two counter 37 to provide a "1" output from flip flop 38 and a "1" output from flip flop 39. The output from counter 37 is taken from the "1" output of flip flop 39 and is applied to AND gate 40 along with the output from shaper 22. The output from shaper 22 activates counter 37 to count two of these pulses and provides the output pulse from counter 37 as illustrated by pulse 41 in curve K, FIG. 4. The output from AND gate 40 is coupled to OR gate 23 and, hence, through AND gate 24 to advance the count of counter 17 by two as illustrated in curves L through O under the second output pulse from source 1**.

When the next output from source 1 is received it will be in a position relative to edge 34 of the output of counter 17 to advance the count thereof by one. Under this condition the AD1 gate will be applied through OR gate 42 to AND gate 43 which also has coupled thereto the output from source 1. The output from AND gate 43 sets flip flop 44 of one counter 45 to provide a "1" output from the "1" stage thereof. The output from shaper 22 is coupled for symmetrical triggering of flip flop 44. The output of counter 45 is illustrated by pulse 46 in curve K, FIG. 4. The output of counter 45 provided by the "1" stage of flip flop 44 is coupled to AND gate 47 along with the output from shaper 22. The resultant output from AND gate 47 is then coupled to OR gate 23 and, hence, through AND gate 24 to control the count of counter 17. As this procedure continues phase lock will be achieved much like that illustrated in FIG. 2, curve K wherein the edge 34 will oscillate about phase coincidence with a phase error of $\Delta T$.

Now let us consider the operation of retarding the count. When the output of source 1 is in region requiring retard there will be an output from one of the retard outputs of generator 26. As illustrated by the first pulse in curve P, FIG. 4, the output from source 1 located in the retard three regions and a time gate from generator 26 is provided illustrated in curve Q, FIG. 4. This time gate is applied through OR gate **35*a* and through OR gate 48. As before, the output from OR gate 35*a* will appropriately set counter 28 which then will proceed to count the output from shaper 22 and provide an output from AND gate 33. The output from OR gate 48 is coupled together with the output from source 1 to AND gate 49 which triggers the "0" stage of flip flop 25 to provide a "0" output to AND gate 24 as illustrated in curve R, FIG. 4. During the time that flip flop 25 provides the "0" output to AND gate 24 the pulses from AND gate 33 and shaper 21 are prevented from reaching counter 17 and, hence, will retard the count, in this instance by three. Due to the counting arrangement of three counter 28, the "1" output will go from the "1" condition to the "0" condition on the third count thereby providing a transition from the "0" condition to the "1" condition in the complement or "0" output of flip flop 31. This complement output is applied through OR gate 50 to trigger flip flop 25 back to the condition where it's supplying a "1" output to AND gate 24. The control of flip flop 25 by OR gate 48 and the counting by counters 27 and 45 are illustrated for the second and third pulse output from source 1 and is self-explanatory and will not be discussed in further details. It should be noted, however, that the complement output from flip flops 39 and 44 of counters 37 and 45, respectively, are applied to OR gate 50 to return flip flop 25 to its "1" output condition after having been triggered to a "0" output condition by the cooperation of OR gate 48 and AND gate 49**.

It should also be mentioned that when the advance count operation is in process there is a complement output from flip flop 31, 39 and 44 applied through OR gate 50 to flip flop 25 but will have no affect on flip flop 25 since the "1" stage thereof is already in the "1" condition.

As in the embodiment of FIG. 1 the output from source 1 and the output from counter 17 is coupled to matched filter 16 to provide the detected output.

Figure 5:
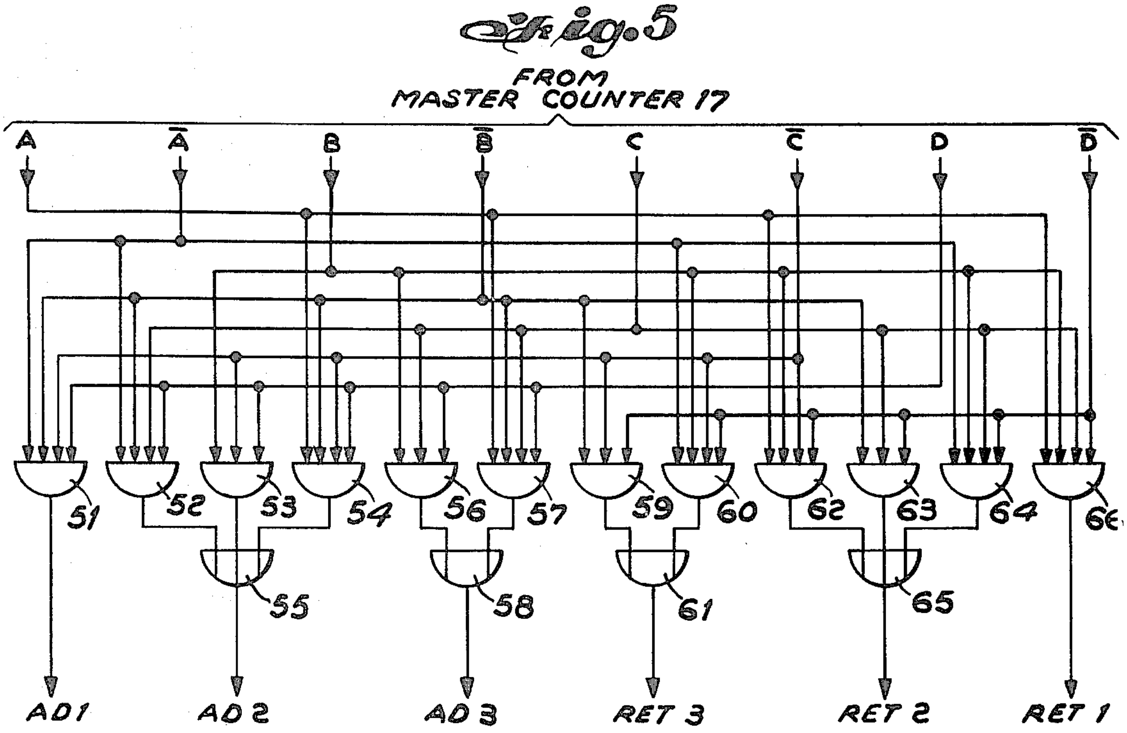
FIG. 5 is a block diagram of the time gates generator of the digital phase lock loop of FIG. 3.

Referring to FIG. 5, there is illustrated therein the logic circuitry dictated by the logic equations to achieve the advance and retard outputs from generator 26. AND gate 51 provides the time gate dictated by the logic equation $\overline{ABC}D$. AND gate 52 provides the time gate dictated by the logic equation $\overline{AB}CD$. AND gate 53 supplies the gate defined by the logic equation $B\overline{C}D$ while AND gate 54 provides the time gate dictated by the logic equation $A\overline{BC}D$. The outputs from AND gates 52, 53 and 54 are coupled to OR gate 55 to provide the AD2 time gates. AND gate 56 provides the time gate dictated by the logic equation BCD. AND gate 57 provides the time gate dictated by the logic equation $A\overline{B}CD$. The output from AND gates 56 and 57 are coupled to OR gate 58 to provide the AD3 time gates. AND gate 59 provides the time gate dictated by the logic equation $\overline{BCD}$. AND gate 60 provides a time gate dictated by the logic equation $\overline{A}B\overline{CD}$. The outputs of AND gates 59 and 60 are coupled to OR gate 61 to provide the RET 3 times gates. AND gates 62, 63 and 64 are coupled to the output terminals of counter 17 in accordance with the logic equations illustrated in FIG. 3 over the output RET 2. The RET 2 time gates are provided by OR gate 65 coupled to the AND gates 62, 63 and 64. AND gate 66 coupled to the output terminals of counter 17 as indicated by the logic equation over the RET 1 output of FIG. 3 provides the RET 1 time gate.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital phase lock loop comprising:
a first source of reference pulses having a given repetition frequency;
a second source of clock pulses having a repetition frequency equal to N times said given repetition frequency, where N is a predetermined integer greater than one;
a master binary counter having a count of N coupled to said second source to produce timing pulses having a repetition frequency equal to said given repetition frequency; and
logic circuitry coupled to said first and second sources and said master counter responsive to the output of at least one stage of said master counter and said reference pulses to adjust the counting of said master counter to phase lock said timing pulses to said reference pulses;
said second source including
first means to generate pulses having a repetition frequency equal to 2 N times said given repetition frequency, and
second means coupled to said first means to provide a first train of said clock pulses and a second train of said clock pulses phase shifted with respect to said first train of clock pulses to dispose the pulses of said second train of clock pulses intermediate the pulses of said first train of clock pulses; and
said logic circuitry including
third means coupled to the "1" and "0" outputs of all the stages of said master counter to generate at least a first gate pulse defining the region of one count advance, at least a second gate pulse defining the region of two count advance, at least a third gate pulse defining the region of three count advance, at least a fourth gate pulse defining the region of one count retard, at least a fifth gate pulse defining the region of two retard, and at least a sixth gate pulse defining the region of three count retard.
a one count binary counter coupled to said third means, said first source and said second means responsive to said reference pulses, said first and third gate pulses and the clock pulses of said second train to count said clock pulses of said second train,
a two count binary counter coupled to said third means, said first source and said second means responsive to said reference signal, said second and fourth gate pulses and said clock pulses of said second train to count said clock pulses of said second train,
a three count binary counter coupled to said third means, said first source and said second means responsive to said third and sixth gate pulses and said clock pulses of said second train to count said clock pulses of said second train,
fourth means coupled to said second means and each of said one count, two count and three count counters to provide at the outputs of said fourth means an appropriate number of said clock pulses of said second train, and
fifth means coupled to said fourth means, said third means and each of said one count, two count and three count counters to inject said appropriate number of said clock pulses of said second train together with the clock pulses of said first train into the first stage of said master counter in the presence of any one of said first, second and third gate pulses and to block said clock pulses of said first and second trains from entering said first stage of said master counter in the presence of any one of said fourth, fifth and sixth gate pulses.

2. A phase lock loop according to claim 1, wherein
said one count counter includes
a first flip flop;
said two count counter includes
a second flip flop, and
a third flip flop coupled for symmetrical triggering thereof to said second flip flop;
said three count counter includes
a fourth flip flop,
a fifth flip flop coupled for symmetrical triggering thereof to said fourth flip flop, and
a sixth flip flop coupled for symmetrical triggering thereof to said fifth flip flop;
a first OR gate is coupled to the first and fourth gate pulse output of said third means;
a first AND gate is coupled to said first source, said first OR gate and said first flip flop to set the output of said first flip flop to a given binary condition;
said first flip flop is coupled to said second means for symmetrical triggering by said clock pulses of said second train;
a second OR gate is coupled to the second and fifth gate pulse output of said third means;
a second AND gate is coupled to said first source, said second OR gate and said second and third flip flops to set the outputs thereof to a given binary condition;
said second flip flop is coupled to said second means for symmetrical triggering by said clock pulses of said second train;
a third OR gate is coupled to the third and sixth gate pulse output of said third means;
a third AND gate is coupled to said first source, and third OR gate and said fourth, fifth and sixth flip flops to set the outputs thereof to a given binary condition;
said fourth flip flop is coupled to said second means for symmetrical triggering by said clock pulses of said second train;
said fourth means includes
a fourth AND gate coupled to the otuput of said first flip flop and the second train output of said second means,
a fifth AND gate coupled to the output of said third flip flop and the second train output of said second means, and
a sixth AND gate coupled to the output of said sixth flip flop and the second train output of said second means; and
said fifth means includes
a fourth OR gate coupled to the first train output of said second means and the outputs of said fourth, fifth and sixth AND gates,
a fifth OR gate coupled to the complement outputs of said first, third and sixth flip flops,
a sixth OR gate coupled to the fourth, fifth and sixth gate pulse outputs of said third means,
a seventh AND gate coupled to said first source and the output of said sixth OR gate,
a seventh flip flop having one stage coupled to said fifth OR gate and the other stage coupled to said seventh AND gate, and
an eighth AND gate coupled to the output of said one stage of said seventh flip flop, the output of said fourth OR gate and the first stage of said master counter.

3. A digital phase lock comprising:

a first source of reference pulses having a given repetition frequency;

a second source of clock pulses having a reception frequency equal to N times said given repetition frequency, where N is a predetermined integer greater than one;

a master binary counter having a count of N coupled to said second source to produce timing pulses having a repetition frequency equal to said given repetition frequency; and logic circuitry coupled to said first and second sources and said master counter responsive to the output of at least one stage of said master counter and said reference pulses to adjust the counting of said master counter to phase lock said timing pulses to said reference pulses;

said first source including a source of digital data signals having a bit frequency equal to said given repetition frequency; and said logic circuitry including an AND gate coupled to said first and second sources and the "1" output of the last stage of said master counter, means coupled to said AND gate and a given one of the stages of said master counter other than the first stage to inject the output signal from said AND gate into said master counter to advance the count thereof when a "1" signal is present on said "1" output of said last stage, and an INHIBIT gate having one input coupled to said second source, the inhibit terminal coupled to said first source and the output coupled to the first stage of said master counter to retard the count of said master counter when a "0" signal is present on said "1" output of said last stage.

4. A digital phase lock loop comprising:

a first source of reference pulses having a given repetition frequency;

a second source of clock pulses having a repetition frequency equal to N times said given repetition frequency, where N is a predetermined integer greater than one;

a master binary counter having a count of N coupled to said second source to produce timing pulses having a repetition frequency equal to said given repetition frequency; and logic circuitry coupled to said first and second sources and said master counter responsive to the output of at least one stage of said master counter and said reference pulses to adjust the counting of said master counter to phase lock said timing pulses to said reference pulses;

said first source including a source of digital data signals having a bit frequency equal to said given repetition frequency;

said second source including first means to generate pulses having a repetition frequency equal to 2 N times said given repetition frequency, and second means coupled to said first means to provide a first train of said clock pulses and a second train of said clock pulses phase shifted with respect to said first train of clock pulses to dispose the pulses of said second train of clock pulses intermediate the pulses of said first train of clock pulses; and said logic circuitry including third means coupled to the "1" and "0" outputs of all the stages of said master counter to generate at least a first gate pulse defining the region of one count advance, at least a second gate pulse defining the region of two count advance, at least a third gate pulse defining the region of three count advance, at least a fourth gate pulse defining the region of one count retard, at least a fifth gate pulse defining the region of two count retard, and at least a sixth gate pulse defining the region of three count retard, a one count binary counter coupled to said third means, said first source and said second means responsive to said reference pulses, said first and third gate pulses and the clock pulses of said second train to count said clock pulses of said second train, a two count binary counter coupled to said third means, said first source and said second means responsive to said reference signal, said second and fourth gate pulses and said clock pulses of said second train to count said clock pulses of said second train, a three count binary counter coupled to said third means, said first source and said second means responsive to said third and sixth gate pulses and said clock pulses of said second train to count said clock pulses of said second train, fourth means coupled to said second means and each of said one count, two count and three count counters to provide at the outputs of said fourth means an appropriate number of said clock pulses of said second train, and fifth means coupled to said fourth means, said third means and each of said one count, two count and three count counters to inject said appropriate number of said clock pulses of said second train together with the clock pulses of said first train into the first stage of said master counter in the presence of any one of said first, second and third gate pulses and to block said clock pulses of said first and second trains from entering said first stage of said master counter in the presence of any one of said fourth, fifth and sixth gate pulses.

5. A digital phase lock loop comprising:

a first source of reference pulses having a given repetition frequency;

a second source of clock pulses having a repetition frequency equal to N times said given repetition frequency, where N is a predetermined integer greater than one;

a master binary counter having a count of N coupled to said second source to produce timing pulses having a repetition frequency equal to said given repetition frequency; and logic circuitry coupled to said first and second sources and said master counter responsive to the output of at least one stage of said master counter and said reference pulses to adjust the counting of said master counter to phase lock said timing pulses to said reference pulses;

said logic circuitry responding to signals on the "1" and "0" outputs of all the stages of said master counter and said reference pulses.

6. A digital phase lock loop comprising:

a first source of reference pulses having a given repetition frequency;

a second source of clock pulses haivng a repetition frequency equal to N times said given repetition frequency, where N is a predetermined integer greater than one;

a master binary counter having a count of N coupled to said second source to produce timing pulses having a repetition frequency equal to said given repetition frequency; and logic circuitry coupled to said first and second sources and said master counter responsive to the output of at least one stage of said master counter and said reference pulses to adjust the counting of said master counter to phase lock said timing pulses to said reference pulses;

said logic circuitry including an AND gate coupled to said first and second sources and the "1" output of the last stage of of said master counter, means coupled to said AND gate and a given one of the stages of said master counter other than the first stage to inject the output signal from said AND gate into said master counter to advance the count thereof when a "1" signal is present on said "1" output of said last stage, and an INHIBIT gate having one input coupled to said second source, the inhibit terminal coupled to said first source and the output coupled to the first stage of said master counter to retard the count of said master counter when a "0" signal is present on said "1" output of said last stage.

References Cited

UNITED STATES PATENTS

| | | | |
|---|---|---|---|
| 3,024,417 | 3/1962 | Secretan | 328—63 X |
| 3,164,777 | 1/1965 | Guanella | 331—18 X |
| 3,209,265 | 9/1965 | Baker et al. | 328—63 |
| 3,218,560 | 11/1965 | Peters | 307—269 X |
| 3,249,763 | 5/1966 | Hopner | 307—269 X |

RODNEY D. BENNETT, Primary Examiner

D. C. KAUFMAN, Assistant Examiner

U.S. Cl. X.R.

307—269; 331—18